(No Model.) 2 Sheets—Sheet 1.
J. T. WILSON.
DIE FOR THE MANUFACTURE OF DRAW BARS.
No. 367,690. Patented Aug. 2, 1887.
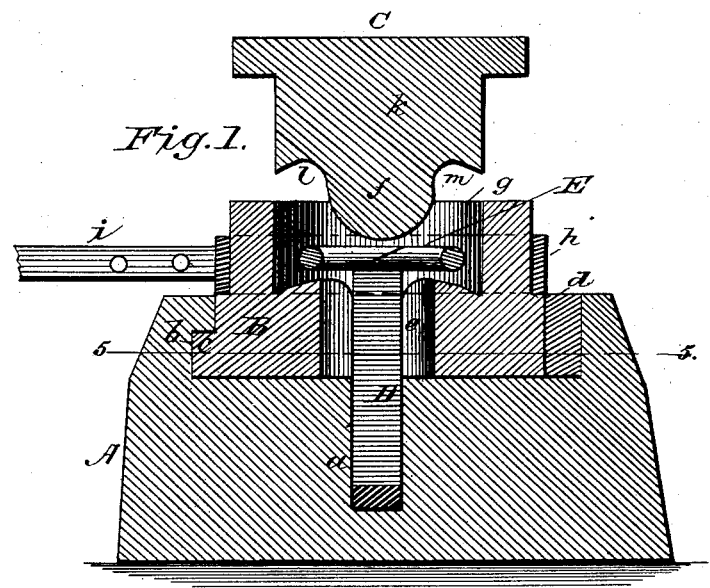
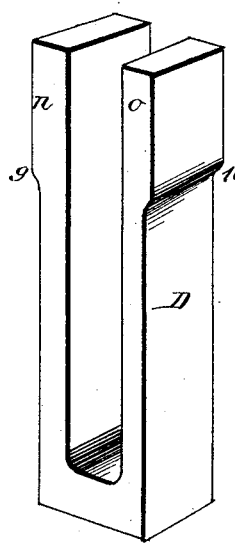
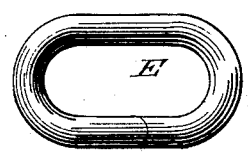
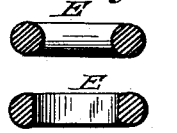
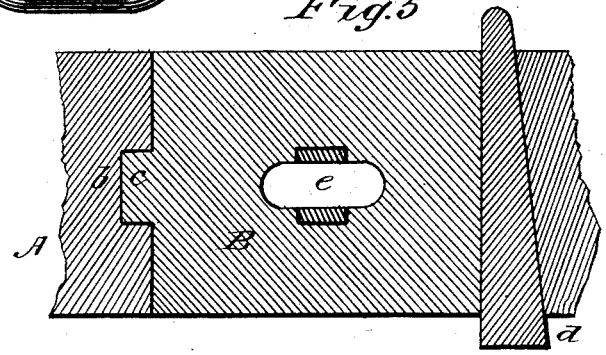
Witnesses
Fred G. Dieterich
Wm E. Dyre
Inventor
J. T. Wilson
By his Attorneys
Johnston, Reinohl & Dyre (No Model.) 2 Sheets—Sheet 2.
J. T. WILSON.
DIE FOR THE MANUFACTURE OF DRAW BARS.
No. 367,690. Patented Aug. 2, 1887.
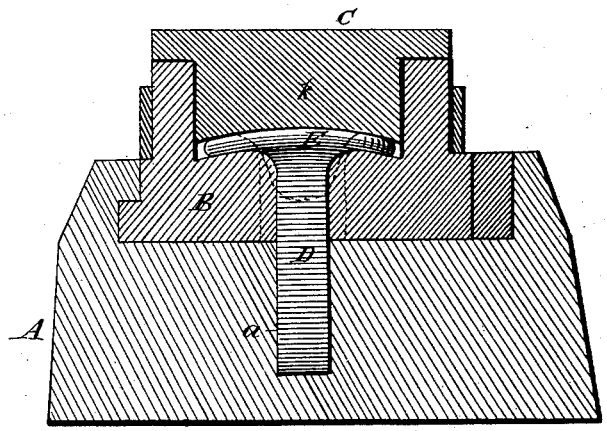
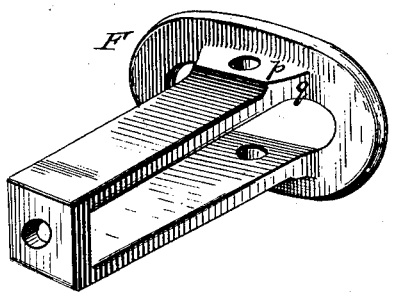
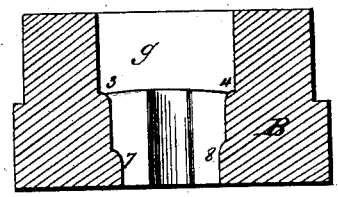
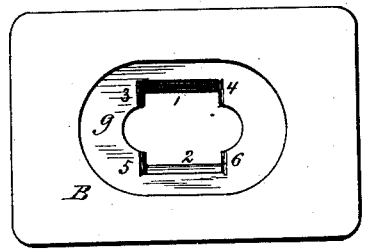
Witnesses
Fred G. Dietrich
Wm. E. Dyre
Inventor
J. T. Wilson
By his Attorneys
Johnston, Reinohl & Dyre

UNITED STATES PATENT OFFICE.

JOHN T. WILSON, OF PITTSBURG, PENNSYLVANIA, ASSIGNOR OF TWO-THIRDS TO JAMES HILL AND THE PITTSBURGH FORGE AND IRON COMPANY, BOTH OF SAME PLACE.

DIE FOR THE MANUFACTURE OF DRAW-BARS.

SPECIFICATION forming part of Letters Patent No. 367,690, dated August 2, 1887.

Application filed June 11, 1887. Serial No. 241,039. (No model.)

*To all whom it may concern:*

Be it known that I, JOHN T. WILSON, a citizen of the United States, residing at Pittsburg, in the county of Allegheny and State of Pennsylvania, have invented certain new and useful Improvements in Dies for the Manufacture of Draw-Bars; and I do hereby declare the following to be a full, clear, and exact description of the invention, such as will enable others skilled in the art to which it appertains to make and use the same.

My invention relates to dies for the manufacture of draw-bars, and has for its object the construction of dies in which the blank for forming the body of the draw-bar and the blank for forming the head may be welded and the head of the bar completed in the die, thus avoiding the necessity of finishing the head by hand.

Under the prevailing systems of manufacturing draw-bars their construction is attended with considerable expense, for the reason that the major portion of the work is done by hand, and when the head has been welded to the body portion in a die a fin has been formed around the periphery of the head, which had afterward to be worked off by hand.

Draw-bars manufactured under my system leave the dies finished, requiring no further work of any kind to be done to them, while the edges on the periphery of the head are nicely rounded, thus presenting a neat and finished appearance at the minimum of cost.

The invention will be hereinafter described, and particularly pointed out in the claims.

In the accompanying drawings, which form a part of this specification, Figure 1 represents a vertical longitudinal section of the dies with the blanks in position ready for welding. Fig. 2 is a perspective of the blank for the body of the draw-bar. Fig. 3 is a plan view of the blank for forming the head of the draw-bar. Fig. 4 represents transverse sections of a blank for the head, one of which is made of round iron, the other of a D-shaped bar or oval. Fig. 5 is a plan on the line 5 5, Fig. 1. Fig. 6 is a vertical longitudinal section of the dies, showing the draw-bar welded, the head formed, and the male die upon the face of the draw-head. Fig. 7 is a transverse section of the female die. Fig. 8 is a plan of the same die, and Fig. 9 is a perspective of a finished draw-bar.

Reference being had to the drawings, and the letters marked thereon, A represents a base having a seat formed therein to receive the female die.

B is the female die, and C the male die.

The base A is provided with a recess, $a$, to receive the lower end of the blank for forming the body of the draw-bar, and with a rabbet, $b$, to receive a projection, $c$, on the female die. The female die is secured in position on the base by means of a key, $d$.

The die B has an aperture, $e$, through it to receive the projection $f$ on the male die C, which enters the head of the draw-bar and forms the opening to receive a link from an adjacent car when in use. In the upper side of the die B is formed a recess, $g$, of sufficient depth to receive the male die C, and the perimeter of which corresponds with the perimeter of a draw-bar head, and the bottom of the recess is curved longitudinally to conform to the curve given the back or inner face of the head; and at the juncture of the sides of the aperture $e$ and the bottom of the recess $g$ the edges are rounded, as shown at 1, 2, 3, 4, 5, and 6, to form the fillets at the point of juncture between the blank for the body and the head of the draw-bar. In the sides of the aperture $e$ are also formed projections 7 8 to receive the shoulders 9 10, formed on the blank for the body of the draw-bar. The die B is provided with a band, $h$, which is shrunk around it, and from one side of the die projects a bar or handle, $i$, having projecting studs for engagement with a crane to hoist the die from its seat and reverse it for releasing a finished draw-bar.

The head $k$ of the male die conforms to the perimeter of the recess $g$ in the die B, and the face of the head conforms to the face of the finished head of a draw-bar. At the juncture of the projection $f$ and the face of the head $k$ are formed fillets $l$ $m$ to round the link-opening in the head of the draw-bar.

D is the blank for the body of the draw-bar, which is of a well-known form. The thickened portions $n$ $o$, when upset by the male die, afford sufficient metal to form the fillets $p$ and $q$ at the juncture of the head and the body of the finished bar F. (Shown in Fig. 9.)

E is the blank for the head of the draw-bar and is made of round, D-shaped, or oval rod or bar iron or steel, the free chamfered ends of which are joined on the side of the blank. This blank forms the subject-matter of a separate application for a patent of even date of filing, Serial No. 241,040.

The operation is as follows: The free ends of the blank D and the blank E are heated in a suitable furnace to a welding heat, and the latter placed over the ends of the former to form a butt-weld in a die, as shown in Fig. 1. The die C then descends, enters the recess $g$ of the die B, and by striking several blows welds the ends of the blank E and the two blanks together at the same operation, and at the same time the thickened portions $n$ $o$ of the blank D are upset and furnish metal to form the fillets $p$ and $q$. It will be observed that the blank E does not fill the recess $g$ in the die B and that the outer edge of the head $k$ does not bear upon the ends of the face of the head, thus preserving the rounded form of the perimeter of the head, but fills the area of the recess $g$, and preventing the formation of fins of metal on the edge and avoiding the necessity of finishing the head by hand, as is necessary in every other system of making draw-bars by the use of dies known to me. The die C may be operated in the usual manner by means of a machine having a reciprocating head, or it may be operated by hydraulic pressure, in which event a single stroke of the plunger will drive the die C down upon the metal with sufficient force to make the welds and form the face and fillets of the head at one stroke.

After the head has been formed the die C is withdrawn, the key $d$ driven back, the die B raised by a suitable crane attached to the handle $i$ and turned upside down, and the finished draw-bar allowed to drop out of the die. By this means draw-bars can be manufactured with great rapidity, largely with unskilled labor, and at a great reduction of cost.

Having thus fully described my invention, what I claim is—

1. A female die for the manufacture of draw-bars, having a recess in its upper side of greater depth than the thickness of a draw-bar head, the perimeter of which conforms to the perimeter of a finished head and whose bottom conforms to the rear face of said head, in combination with a male die whose perimeter conforms to the perimeter of and enters the recess in the female die, and the face of the projection conforms to the outer surface of a finished draw-bar head, substantially as described.

2. A female die for the manufacture of draw-bars, having a recess in its upper side of greater depth than the thickness of a draw-bar head, the perimeter of which conforms to but is slightly greater than the perimeter of a finished head and whose bottom conforms to the rear face of said head, in combination with a male die whose perimeter conforms to the perimeter of and enters the recess in the female die, and the face of which projection conforms to the outer surface of a finished head, substantially as described.

3. A female die for the manufacture of draw-bars, having a recess whose perimeter is greater than the perimeter of a finished draw-bar head and whose bottom conforms to the rear face of said head, in combination with a male die, the face of which conforms to the outer surface of a finished head and is provided with clearance around the edges of its ends, substantially as and for the purpose set forth.

In testimony whereof I affix my signature in presence of two witnesses.

JOHN T. WILSON.

Witnesses:
  S. WOLF,
  D. C. REINOHL.